United States Patent [19]

McKechnie

[11] 4,227,401
[45] Oct. 14, 1980

[54] SURFACE ELEVATION MEASURING APPARATUS

[75] Inventor: John C. McKechnie, Maitland, Fla.

[73] Assignee: The United States of America as represented by the Secretary of the Navy, Washington, D.C.

[21] Appl. No.: 39,241

[22] Filed: May 15, 1979

[51] Int. Cl.[3] .............................................. G01B 5/28
[52] U.S. Cl. ...................................... 73/105; 73/573
[58] Field of Search ........... 73/105, 573, 594, 432 SO, 73/104; 33/1 H

[56] References Cited
U.S. PATENT DOCUMENTS

| 3,153,338 | 10/1964 | Kleesattel | 73/573 |
| 3,208,272 | 9/1965 | Hall, Jr. et al. | 73/105 |
| 3,534,596 | 10/1970 | Batts et al. | 73/105 |

Primary Examiner—Jerry W. Myracle
Attorney, Agent, or Firm—Richard S. Sciascia; Robert W. Adams; David S. Kalmbaugh

[57] ABSTRACT

A terrain probe for sensing the elevation of a terrain surface whose profile is being measured and followed. A two-phase induction motor will raise or lower the terrain probe in response to either an increase or decrease in the elevation of the terrain surface. A four arm bridge circuit, which has an arm enclosed within the terrain probe, in combination with a low frequency oscillator, a differential amplifier, and power amplifier generate a sinusoidal drive signal which controls the two-phase induction motor.

16 Claims, 3 Drawing Figures

SURFACE ELEVATION MEASURING APPARATUS

BACKGROUND OF THE INVENTION

1. Field of the Invention

This invention relates generally to geometrical instruments. In particular, this invention relates to a terrain probe which senses the elevation of a terrain surface.

2. Description of the Prior Art

A wide variety of terrain probes are available for sensing the elevation of a terrain surface whose profile is being measured and followed. And for their intended purpose, these terrain probes performed satisfactorily. However, the servo systems required to raise or lower these terrain probes, in response to a change in elevation of the terrain surface which is being sensed, are very complex and quite costly. In addition, these terrain probes cause extensive damage to the terrain surface due to the scraping of the terrain surface by the sensor element of the terrain probe.

SUMMARY OF THE INVENTION

The subject invention overcomes some of the disadvantages of the prior art, including those mentioned above, in that it comprises a terrain probe which may be raised or lowered by a two-phase induction motor in response to a change in the elevation of a terrain surface which is being sensed by the terrain probe. Enclosed within the terrain probe is an arm of a four arm bridge circuit which will sense any change in the pressure applied against the terrain probe by the terrain surface. Thus, when the terrain pressure against the terrain probe is either increased or decreased due to a change in the elevation of the terrain surface, the four arm bridge circuit, when uniquely combined with a low frequency oscillator, a differential amplifier, and a power amplifier, will generate a sinusoidal drive signal, which controls the two-phase induction motor. The two-phase induction motor will either raise or lower the terrain probe until the pressure applied to the terrain probe reaches a predetermined value. When the terrain pressure reaches this predetermined value, the potential difference across the output terminals of the four arm bridge circuit will be zero, causing the two-phase induction motor to maintain the terrain probe at a fixed position along the vertical axis above the terrain surface.

DESCRIPTION OF THE PREFERRED EMBODIMENT

Figure 1:
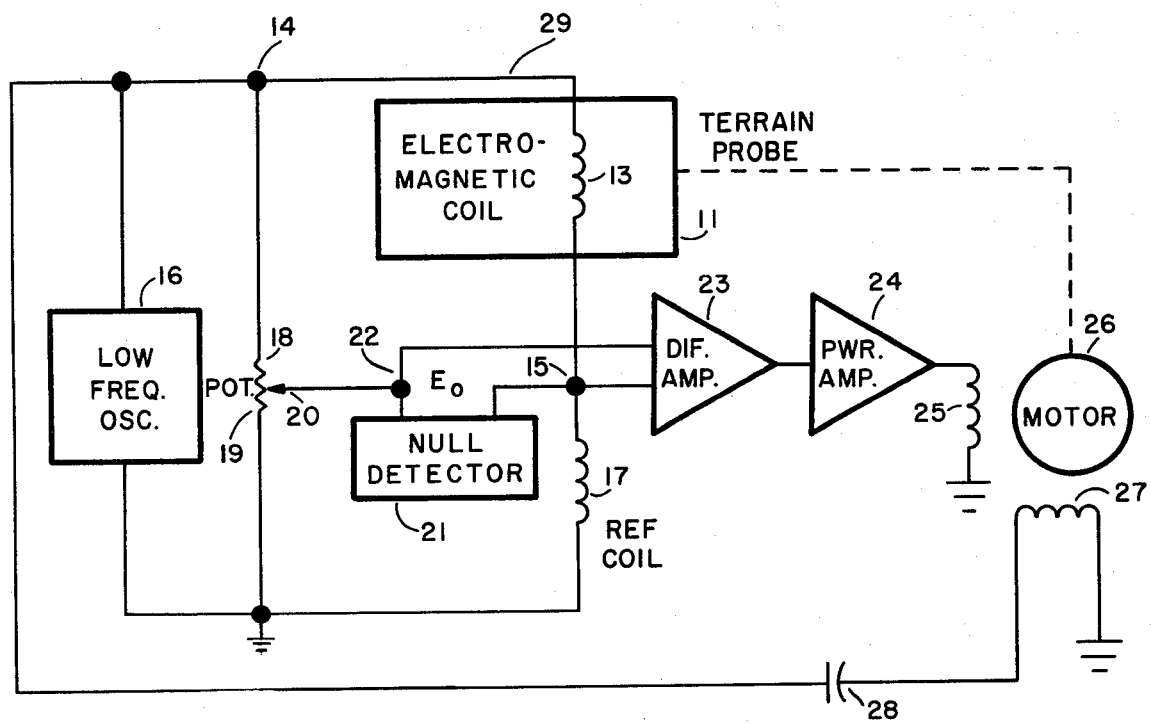
FIG. 1 is a schematic diagram of the circuitry portion of the invention.

The preferred embodiment of the subject invention will now be discussed in some detail in conjunction with all of the figures of the drawings, wherein like parts are designated by like reference numerals.

Figure 2:
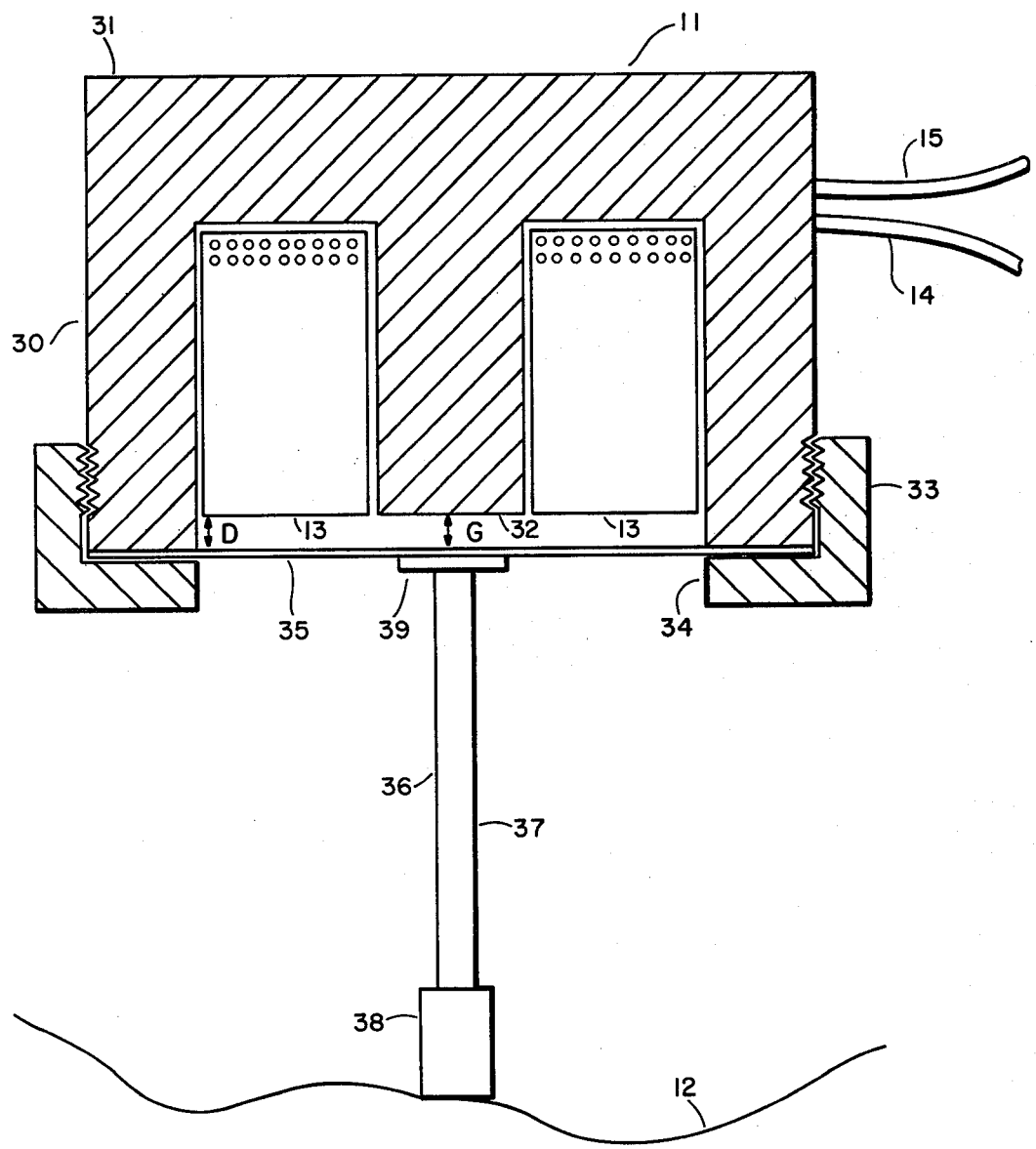
FIG. 2 is a diagrammatical representation of the terrain probe of the invention.

Referring to FIG. 1, there is shown a terrain probe 11 which senses the elevation of a terrain surface 12, FIG. 2, whose profile is being measured and followed. Enclosed within terrain probe 11 is an electromagnetic coil 13 which has a first lead 14 and a second lead 15 protruding from terrain probe 11. The first output of a low frequency oscillator 16, which operates at a frequency of four hundred hertz, is effectively connected to first lead 14 of electromagnetic coil 13. Second lead 15 of electromagnetic coil 13 is connected to the first lead of a reference coil 17, with the inductance value of reference coil 17 being equal to the inductance value of electromagnetic coil 13. The second lead of reference coil 17 is effectively connected to the second output of low frequency oscillator 16.

Further, there is shown in FIG. 1 a potentiometer 18 having a fixed resistance 19 and a movable voltage pick-off arm 20 in slidable engagement with fixed resistance 19. The first input terminal of fixed resistance 19 of potentiometer 18 is connected to the first output of low frequency oscillator 16, and the second input terminal of fixed resistance 19 of potentiometer 18 is connected to the second output of low frequency oscillator 16, thereby forming a four arm bridge circuit 29, with potentiometer 18 constituting the first and second arms of four arm bridge circuit 29. Electromagnetic coil 13 and reference coil 17 respectively constitute the third and fourth arms of four arm bridge circuit 29.

A null detector 21 is effectively connected between output terminal 22 of movable arm 20 of potentiometer 18 and second lead 15 of electromagnetic coil 13, and measures a voltage $E_o$ between output terminal 22 of potentiometer 18 and second lead 15 of electromagnetic coil 13. Output terminal 22 of potentiometer 18 is also connected to the first input of a differential amplifier 23, and second lead 15 of electromagnetic coil 13 is, in addition, connected to the second input of differential amplifier 23. The output of differential amplifier 23 is, in turn, connected to a power amplifier 24, with the output of power amplifier 24 connected to a control winding 25 of a two-phase induction motor 26. The first output of low frequency oscillator 16 is connected to the input of a capacitor 28, the output of which is connected to a reference winding 27 of two-phase induction motor 26. The shaft output of two-phase induction motor 26 is mechanically connected to terrain probe 11.

Low frequency oscillator 16, potentiometer 18, differential amplifier 23, and power amplifier 24, elements which form an integral part of this invention, are all well known, conventional, and commercially available. Null detector 21 may be any conventional and commercially available voltmeter. Two-phase induction motor 26 may also be any conventional and commercially available two-phase induction motor and, in particular, a two-phase induction motor manufactured by I.M.S. Magnetics Corp. of Westbury, N.Y., was found to perform quite satisfactorily.

Referring now to FIG. 2, there is shown terrain probe 11 which comprises a cylindrical housing 30 of ferromagnetic material having an upper end wall 31. Upper end wall 31 has a centrally located downwardly protruding member 32 extending to a predetermined distance D above the lower end of cylindrical housing 30. For terrain probe 11 to operate effectively, it has been found that predetermined distance D should be 0.02 inches. Enclosed within cylindrical housing 30 is electromagnetic coil 13, which is a copper coil wound around downwardly protruding member 32, and protruding from cylindrical housing 30 are first lead 14 and second lead 15 of electromagnetic coil 13. A rim cap 33 is effectively attached to the lower end of cylindrical housing 30 and has a centrally located circular perforation 34. A flexible diaphragm 35 of ferromagnetic material is located between the lower end of cylindrical housing 30 and rim cap 33. Further, flexible diaphragm 35 is located a gap width G below downwardly protruding member 32.

A surface sensor 36, which is effectively attached to the bottom surface of flexible diaphragm 35 by a fastener element 39, passes through circular perforation 34 of rim cap 33. Surface sensor 36 includes an elongated rod 37 attached at one end to the bottom surface of flexible diaphragm 35 by fastener element 39, and a tip 38 fastened to the end of elongated rod 37 that is opposite the end attached to the bottom surface of flexible diaphragm 35. Tip 38 may, for example, be a wheel.

Figure 3:
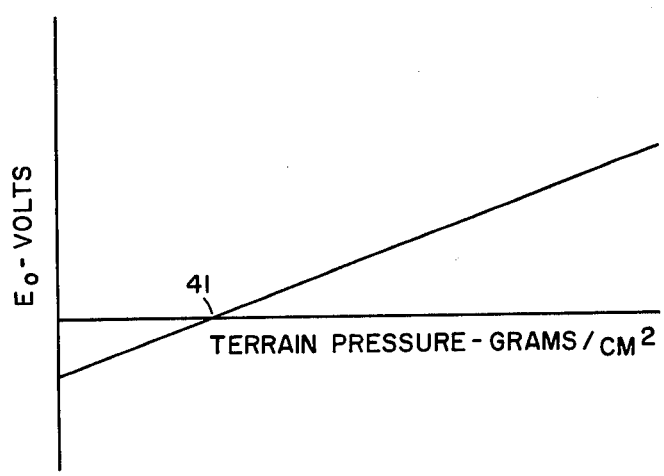
FIG. 3 is a graphical representation of the relationship between the terrain pressure applied by a terrain surface against the terrain probe of FIG. 2, and the voltage between the output terminals of a bridge circuit of FIG. 1.

Referring now to FIGS. 1 and 3, there is shown a graphical representation of the approximate relationship between the terrain pressure applied by terrain surface 12 (FIG. 2) to terrain probe 11 and the voltage $E_o$ between output terminal 22 of potentiometer 18 and second lead 15 of electromagnetic coil 13. A detailed analysis of the graphical representation of FIG. 3 will be discussed below.

The operation of the invention will now be discussed in conjunction with all of the figures of the drawing.

Referring to FIGS. 1 and 2, low frequency oscillator 16 generates a sinusoidal reference signal whose frequency is four hundred hertz. This sinusoidal reference signal, generated by low frequency oscillator 16, causes flexible diaphragm 35 to vibrate at a frequency rate of four hundred hertz, with an amplitude of vibration of 0.005 inches. The amplitude of vibration of flexible diaphragm 16 is selected to be a scale factor of the deflection a wheel, being simulated by terrain probe 11, on a carrier vehicle, not shown, will sustain when crossing an actual terrain surface, not shown. Thus, for example, if the wheel on the carrier vehicle has a maximum allowable deflection of three inches, and the scale factor is six hundred to one, the amplitude of vibration of flexible diaphragm 16 is 0.005 inches. The frequency of vibration is determined by the equation:

$$F = \frac{2}{\sqrt{2S/A}} \quad (1)$$

where F is the frequency of vibration of flexible diaphragm 35, S is the amplitude of vibration of flexible diaphragm 35, and A is one earth gravity unit of acceleration. With S equal to 0.005 inches, F equals 394 hertz, which is approximately the frequency of the sinusoidal reference signal generated by low frequency oscillator 16.

At this time, it is to be noted that when flexible diaphragm 35 is vibrating at four hundred hertz, surface sensor 36 will also vibrate at four hundred hertz, thus reducing the coefficient of friction between terrain surface 12 and tip 38 of surface sensor 36 to a value of 0.001. Thus, significant reduction in the coefficient of friction between tip 38 and terrain surface 12, in turn, eliminates the scraping of terrain surface 12 by tip 38 of surface sensor 36.

Referring to FIGS. 1, 2, and 3, there is shown predetermined terrain pressure 41 which, when applied to surface sensor 36 of terrain probe 11, causes the potential difference $E_o$ measured by null detector 21 between output terminal 22 of potentiometer 18 and second lead 15 of electromagnetic coil 13 to be zero volts. A suitable value for predetermined terrain pressure 41 is ten grams per square centimeter.

To obtain a measurement by null detector 21 of zero volts when the terrain pressure applied to surface sensor 36 is ten grams per square centimeter, movable arm 22 of potentiometer 18 is adjusted so that the voltage $E_o$ between output terminal 22 of potentiometer 18 and second lead 15 of electromagnetic coil 13 is zero volts. When the voltage $E_o$ detected by null detector 21 is zero volts, the voltage drop across the first arm of bridge circuit 29 will be equal to the voltage drop across the third arm of bridge circuit 29. This results in the voltage appearing at the output of differential amplifier 23 and the output of power amplifier 24 being equal to zero volts. Accordingly, when the output voltage of power amplifier 24 is zero volts, control winding 25 of two-phase induction motor 26 will not be excited and terrain probe 11 will remain in a fixed position along a vertical axis above terrain surface 12. Thus, for example, if terrain probe 11 is moving across terrain surface 12 and terrain surface 12 is level, then two-phase induction motor 26 will neither raise nor lower terrain probe 11 along the vertical axis above terrain surface 12.

Referring to the graphical representation of FIG. 3, when the terrain pressure applied to surface sensor 36 is increased above predetermined terrain pressure 41 due to an increase in the elevation of terrain surface 12, the voltage $E_o$ will change so that there is a positive potential difference between output terminal 22 of potentiometer 18 and second lead 15 of electromagnetic coil 13. This change in the voltage $E_o$ is the result of an increase in the voltage drop appearing across electromagnetic coil 13. When terrain surface 12 causes the terrain pressure applied to surface sensor 36 to increase, the gap width G between flexible diaphragm 35 and centrally located downwardly protruding member 32 will decrease. This narrowing of the gap width G between flexible diaphragm 35 and downwardly protruding member 32 will cause an increase in the magnetic flux induced by electromagnetic coil 13. Since the relationship between the induced voltage of electromagnetic coil 13, which is the voltage drop across electromagnetic coil 13, and the magnetic flux of electromagnetic coil 13 is governed by the equation:

$$E_L = d\phi/dt \quad (2)$$

where $E_L$ is the induced voltage, and $\phi$ is the magnetic flux of electromagnetic coil 13, an increase in the magnetic flux of electromagnetic coil 13 will cause a corresponding increase in the induced voltage of electromagnetic coil 13. Thus, the amplitude of the sinusoidal reference signal generated by low frequency oscillator 16 will be smaller at second lead 15 of electromagnetic coil 13 than at output terminal 22 of potentiometer 18, due to the increased voltage drop across electromagnetic coil 13. This results in a sinusoidal signal appearing at the output of differential amplifier 23, whose amplitude is proportional to the difference in amplitudes of the two separate input signals to differential amplifier 23. The sinusoidal output signal from differential amplifier 23 is amplified by power amplifier 24 to provide a sinusoidal drive signal for the excitation of control winding 25 of two-phase induction motor 26. Reference winding 27 of two-phase induction motor 26 is excited by the sinusoidal reference signal generated by low frequency oscillator 16 with capacitor 28 phase shifting the sinusoidal reference signal by 90°.

Upon the excitation of control winding 25 by the sinusoidal drive signal, two-phase induction motor 26 will raise terrain probe 11 along the vertical axis above terrain surface 12 until the terrain pressure applied to surface sensor 36 is equal to ten grams per square centimeter. As previously discussed, when the terrain pressure applied to surface sensor 36 of terrain probe 11 is equal to ten grams per square centimeter, the output voltage of power amplifier 25 will be zero volts, thus causing two-phase induction motor 26 to discontinue raising terrain probe 11 and maintain terrain probe 11 at a fixed position along the vertical axis above terrain surface 12.

Because the operation of this invention when the terrain pressure is greater than ten grams per square centimeter is almost identical to the operation of this invention when the terrain pressure is less than ten grams per square centimeter, an analysis of the latter will be very brief.

When the terrain pressure applied to surface sensor 36 is decreased below predetermined terrain pressure 41, due to a decrease in the elevation of terrain surface 12, the gap width G between flexible diaphragm 35 and downwardly protruding member 32 will increase, causing the induced voltage of electromagnetic coil 13 to decrease. This decrease in the induced voltage of electromagnetic coil 13 will result in a negative potential difference between output terminal 22 of potentiometer 18 and second lead 15 of electromagnetic coil 13. Thus, the sinusoidal drive signal, appearing at the output of power amplifier 25, will be phase shifted 180°, causing two-phase induction motor 26 to lower terrain probe 11 along the vertical axis above terrain surface 12 until the terrain pressure applied to surface sensor 36 is equal to ten grams per square centimeter.

Again, as previously discussed, when the terrain pressure applied to surface sensor 36 of terrain probe 11 is equal to ten grams per square centimeter, the output voltage of power amplifier 25 will be zero volts, causing two-phase induction motor 26 to discontinue lowering terrain probe 11, and to maintain terrain probe 11 at a fixed position along the vertical axis above terrain surface 12.

From the foregoing description, it may readily be seen that the subject invention comprises a new, unique, and exceedingly useful surface elevation measuring apparatus which constitutes a considerable improvement over the prior art. Obviously, many modifications and variations of the present invention are possible in light of the above teachings. It is, therefore, to be understood that within the scope of the appended claims, the invention may be practiced otherwise than as specifically described.

What is claimed is:

1. A surface elevation measuring apparatus comprising in combination:
   terrain probing means for sensing the elevation of a terrain surface whose profile is being measured and followed;
   oscillating means, having first and second outputs for generating a sinusoidal reference signal having a predetermined frequency;
   bridge circuit means having a quartet of arms, with one of said arms being enclosed within said terrain probing means; and having a first input terminal connected to the first output of said oscillating means, a second input terminal connected to the second output of said oscillating means, a first output terminal, and a second output terminal for providing a first sinusoidal signal, having a fixed amplitude, and a second sinusoidal signal, having a variable amplitude, in response to said sinusoidal reference signal generated by said oscillating means;
   amplifier means having a first input connected to the first terminal output of said bridge circuit means, a second input connected to the second terminal output of said bridge circuit means, and an output for providing a sinusoidal drive signal whose amplitude is proportional to the difference between the amplitude of the first sinusoidal signal and the amplitude of the second sinusoidal signal provided by said bridge circuit means; and
   servo drive motor means having an input connected to the output of said amplifier, and a shift output effectively connected to said terrain probing means for raising or lowering said terrain probing means along a vertical axis above said terrain surface in response to the sinusoidal drive signal provided by said amplifier means.

2. A surface elevation measuring apparatus according to claim 1, wherein said terrain probing means comprises:
   a cylindrical housing of ferromagnetic material having an upper end wall, said upper end wall having a centrally located downwardly protruding member extending to a predetermined distance above the lower end of said cylindrical housing;
   a rim cap effectively attached to the lower end of said cylindrical housing, and having a centrally located circular perforation;
   a flexible diaphragm of ferromagnetic material located between the lower end of said cylindrical housing and said rim cap; and
   a surface sensor effectively attached to said flexible diaphragm and passing through the circular perforation of said rim cap.

3. A surface elevation measuring apparatus according to claim 2, wherein said surface sensor comprises:
   an elongated rod attached at one end to said flexible diaphragm; and
   a tip fastened to the end of said elongated rod that is opposite the end attached to said flexible diaphragm.

4. A surface elevation measuring apparatus according to claim 3, wherein said tip comprises a wheel.

5. A surface elevation measuring apparatus according to claim 1, wherein said terrain surface comprises a model board surface.

6. A surface elevation measuring apparatus according to claim 1, wherein said oscillating means comprises a low frequency oscillator.

7. A surface elevation measuring apparatus according to claim 1, wherein the predetermined frequency of said sinusoidal reference signal is four hundred hertz.

8. A surface elevation measuring apparatus according to claim 1, wherein said bridge cicuit means comprises:
   an electromagnetic coil enclosed within said terrain probing means, and having first and second leads protruding from said terrain probing means with the first lead thereof effectively connected to the first output of said oscillating means;
   a reference coil having a first lead connected to the second lead of said electromagnetic coil and a second lead connected to the second output of said oscillating means; and a potentiometer having a fixed resistance and a movable arm in slidable engagement therewith, with the fixed resistance of said potentiometer having a first input terminal effectively connected to the first output of said low frequency oscillator, and a second input terminal effectively connected to the second output of said low frequency oscillator.

9. A surface elevation measuring apparatus according to claim 1, wherein said amplifier means comprises:
a differential amplifier having a first input connected to the first output terminal of said bridge circuit means, a second input connected to the second output terminal of said bridge circuit means, and an output; and
a power amplifier having an input connected to the output of said differential amplifier.

10. A surface elevation measuring apparatus according to claim 1, wherein said servo drive motor means comprises a two-phase induction motor.

11. A surface contour measuring apparatus, comprising in combination:
a terrain probe;
an electromagnetic coil enclosed within said terrain probe, and having first and second leads protruding from said terrain probe;
a low frequency oscillator having a first output connected to the first lead of said electromagnetic coil and a second output for generating a sinusoidal reference signal having a predetermined frequency;
a potentiometer having a fixed resistance, and a movable arm in slidable engagement therewith, with the fixed resistance of said potentiometer having a first input terminal effectively connected to the first output of said low frequency oscillator, and a second input terminal effectively connected to the second output of said low frequency oscillator, and the movable arm of said potentiometer having an output terminal;
a reference coil having a first lead connected to the second lead of said electromagnetic coil and a second lead connected to the second output of said low frequency oscillator;
a differential amplifier having a first input connected to the output terminal of the movable arm of said potentiometer, a second input connected to the second lead of said electromagnetic coil, and an output;
a power amplifier having an input connected to the output of said differential amplifier; and
a servo drive motor having an input connected to the output of said power amplifier, and a shaft output effectively connected to said terrain probe.

12. A surface contour measuring apparatus according to claim 11, wherein said terrain probe comprises:
a cylindrical housing of ferromagnetic material having an upper end wall, said upper end wall having a centrally located, downwardly protruding member extending to a predetermined distance above the lower end of said cylindrical housing;
a rim cap effectively attached to the lower end of said cylindrical housing, and having a centrally located circular perforation;
a flexible diaphragm of ferromagnetic material located between the lower end of said cylindrical housing and said rim cap; and
a surface sensor effectively attached to said flexible diaphragm and passing through the circular perforation of said rim cap.

13. A surface contour measuring apparatus according to claim 12, wherein said surface sensor comprises:
an elongated rod effectively attached at one end to said flexible diaphragm; and
a tip fastened to the end of said elongated rod that is opposite the end attached to said flexible diaphragm.

14. A surface contour measuring apparatus according to claim 13, wherein said tip comprises a wheel.

15. A surface contour measuring apparatus according to claim 11, wherein the predetermined frequency of said sinusoidal reference signal is four hundred hertz.

16. A surface contour measuring apparatus according to claim 11, wherein said servo drive motor comprises a two-phase induction motor.

* * * * *